US006434549B1

(12) United States Patent
Linetsky et al.

(10) Patent No.: US 6,434,549 B1
(45) Date of Patent: Aug. 13, 2002

(54) NETWORK-BASED, HUMAN-MEDIATED EXCHANGE OF INFORMATION

(75) Inventors: Gene Linetsky, Palo Alto; David Rubin, Menlo Park, both of CA (US)

(73) Assignee: Ultris, Inc., Menlo Park, CA (US)

( * ) Notice: Subject to any disclaimer, the term of this patent is extended or adjusted under 35 U.S.C. 154(b) by 0 days.

(21) Appl. No.: 09/458,836

(22) Filed: Dec. 13, 1999

(51) Int. Cl.[7] .............................................. G06F 17/30
(52) U.S. Cl. ............................................... 707/3; 707/5
(58) Field of Search ............................... 707/3, 4, 5, 6, 707/7

(56) References Cited

U.S. PATENT DOCUMENTS

| | | | |
|---|---|---|---|
| 4,972,328 A | 11/1990 | Wu et al. ...................... 706/59 |
| 5,270,701 A | 12/1993 | Ito et al. ...................... 709/213 |
| 5,301,314 A | 4/1994 | Gifford et al. ............... 707/101 |
| 5,412,758 A | 5/1995 | Srikanth et al. ............... 706/59 |
| 5,517,405 A | 5/1996 | McAndrew et al. .......... 706/45 |
| 5,628,011 A | 5/1997 | Kirk et al. .................... 707/10 |
| 5,768,580 A | 6/1998 | Wical .......................... 707/102 |
| 5,793,365 A | 8/1998 | Tang et al. .................. 345/758 |
| 5,835,683 A | 11/1998 | Corella et al. ................ 706/59 |
| 5,855,015 A | 12/1998 | Shoham .......................... 707/5 |
| 5,862,223 A | 1/1999 | Walker et al. ................ 705/30 |
| 5,893,091 A | 4/1999 | Hunt et al. ..................... 707/3 |
| 5,918,010 A | 6/1999 | Appleman .................. 709/203 |
| 5,931,907 A | 8/1999 | Davies et al. ............... 709/218 |
| 5,948,054 A | 9/1999 | Nielsen ....................... 709/200 |
| 5,956,491 A | 9/1999 | Marks ......................... 709/250 |
| 5,963,940 A | 10/1999 | Liddy et al. .................... 707/5 |
| 5,987,446 A | 11/1999 | Corey et al. .................... 707/3 |
| 5,991,799 A | 11/1999 | Yen et al. .................... 709/218 |
| 6,003,082 A | 12/1999 | Gampper et al. ........... 709/225 |
| 6,006,218 A | 12/1999 | Breese et al. ................... 707/3 |
| 6,094,652 A | * 7/2000 | Faisal ............................ 707/5 |
| 6,263,335 B1 | * 7/2001 | Paik et al. ...................... 707/5 |
| 6,292,830 B1 | * 9/2001 | Taylor et al. ................ 709/224 |

OTHER PUBLICATIONS

Task–oriented and similarity–based retrieval—Lauzon, D.; Rose, T. Dept. of Comput. Sci., Toronto Univ., Ont., Canada This paper appears in: Knowledge–Based Software Engineering Conference, 1994.Proceedings., Ninth On page(s):98–107 (Sep. 20–23, 1994).*

* cited by examiner

*Primary Examiner*—Diane D. Mizrahi
(74) *Attorney, Agent, or Firm*—John F. Schipper (57) ABSTRACT

A system for machine- and human-mediated exchange of information, provided in response to receipt of an information query. The received query is first assigned to a selected category or classification, by a human classifier or through automatic parsing of the statement of the query by a computer. A search for a positive response to the query is performed automatically, using an information repository (including, but not limited to, one or more databases) that corresponds to the query classification. If the repository provides no positive response, the system allows a group of one or more human responders having relevant information to bid on providing a positive response to the query. A responder can also route the query to other responders. Optionally, a responder cost bid is compared with a user-supplied upper limit on cost. If a bid is accepted and the responder is selected, the responder provides a positive response to the query. Each positive response is provided for review by the source of the query, and the query source may modify the query in response to information received. Optionally, one or more time intervals may be specified for response to a query. Optionally, an information seeker can gain access to and use a query submitted by, and a pre-existing query response received by, a preceding information seeker and may engage in a chat session with one or more responders and with other information seekers.

42 Claims, 9 Drawing Sheets

NETWORK-BASED, HUMAN-MEDIATED EXCHANGE OF INFORMATION

FIELD OF THE INVENTION

This invention relates to searching for, and exchange of, information, using a combination of human participants and computer-based information repositories.

BACKGROUND OF THE INVENTION

Today, most searches for information stored in electronic format are mediated entirely by a computer, or by one or more networks of computers. However, a computer is a quick, but inflexible, responder, and the query source presenting a query can never be confident that the query is being adequately interpreted, or that several shades of meaning of the query are being explored. Herein, a "query" can be a general or specific question, an observation, one or more key words or phrases, a statement of asserted fact or any similar interrogatory or statement. Another problem is that even after a query is adequately interpreted, there is no assurance that a satisfactory response to the query is present in the database or other information repository being searched.

What is needed is an information exchange system that provides a combination of human-mediated and computer-mediated responses to a query and that permits real time dialog between the information seeker and a human mediator to clarify and/or adjust the query, in order to focus on one or several meanings intended by the information seeker. Preferably, the system should take advantage of the collective knowledge of one or more authorities or individuals who have access to the specific information in a given knowledge area and should supplement this knowledge with knowledge available from one or more computer-mediated information repositories. Preferably, the system should be flexible so that the user or seeker can terminate the search at any of two or more levels of queries and should provide the user or seeker with earlier responses to any parallel or related queries.

SUMMARY OF THE INVENTION

These needs are met by the invention, which provides responses to a query at each of at least three levels: at a first level, where a dispatcher or coordinator classifies the query and optionally responds to the query from the dispatcher's personal knowledge; at a second level, using electronic or other searching of one or more information repositories accessible from the dispatcher's network or computer terminal; and at third and subsequent levels, using the collective knowledge of other persons with relevant expertise or access to relevant information concerning the query. Herein, a "terminal" can be a computer connected to a computer network, a wireless portable network access device, a cellular phone, a conventional landline telephone, or any other means that facilitates connecting to the network and provides the necessary local computational functionality.

The user or information seeker, together with the other persons ("responders"), provide an information exchange mechanism, in which a user or information seeker for one query may become a responder for another query. A query circulates through this information exchange network until the query is interrupted by the user or is received by one or more responders, human or computer-based, that provides a satisfactory response for the user. The user may then provide comment or feedback on some or all of the responses.

Large numbers of users or information seekers, connected to an information network such as the Internet, exchange information by presenting natural language queries to the system and receiving natural language responses from the system. At any time, a (properly authorized) user can choose to provide a response to a query posted on the network, or to indicate an interest in any subsequent response to the query. Some users may (also) serve as query dispatchers, by providing a classification or categorization of the query according to some classification format, by providing meta-data markup of one or more queries posted by others, by creating a new class or category, if needed, or by routing one or more queries to other users believed to be likely responders to the query(ies). These actions can result in multi-level information routing.

A central controller may collect all queries and responses thereto, thus adding to a potential central knowledge base, but does not attempt to classify or route the queries. The controller broadcasts or multicasts the queries to all users or information seekers, or to a selected subset of all users, who employ information filters, located at the users' computer terminals, to parse all queries and to retain relevant queries. An information filter provides rough semantic filtering based on a query's asserted classification, or upon the presence of key words. This filtering does not serve as a final decision on which queries to respond to. A user can initiate a real time conversation (chat session) with one or more other users who are sources of one or more other queries that are visible to the user, based on topics of common interest that are implicit or explicit in these queries. The user can also initiate a real time session with other users, regardless of their present or past queries, if the network addresses or other identifiers of these other users have been previously stored on the user's computer terminal.

The system optionally provides an indication of which users are presently on line. Each query is assigned a globally unique identifier at the terminal and time the query is first presented, thus eliminating use of an extensive central look-up table and enabling a user to instantly subscribe to a query and its progeny. An optional, dynamically adjustable scoring point scheme is adopted to unify and standardize the results of user feedback, the quality of the classifications and search results, and the performance and efficiency of dispatchers and responders used to supplement the searches. A scoring point scheme is used to reward top user-contributors to the information exchange and to identify users that do not adequately participate in or contribute to the exchange.

BRIEF DESCRIPTION OF THE DRAWINGS

FIGS. 2(A–D) is a flow chart illustrating an overall procedure for practicing the invention.

FIGS. 3(A–B) and 4(A–B) are flow charts illustrating procedures that provide direct communication between a seeker and one or more responders concerning a query.

DESCRIPTION OF BEST MODES OF THE INVENTION

Figure 1:
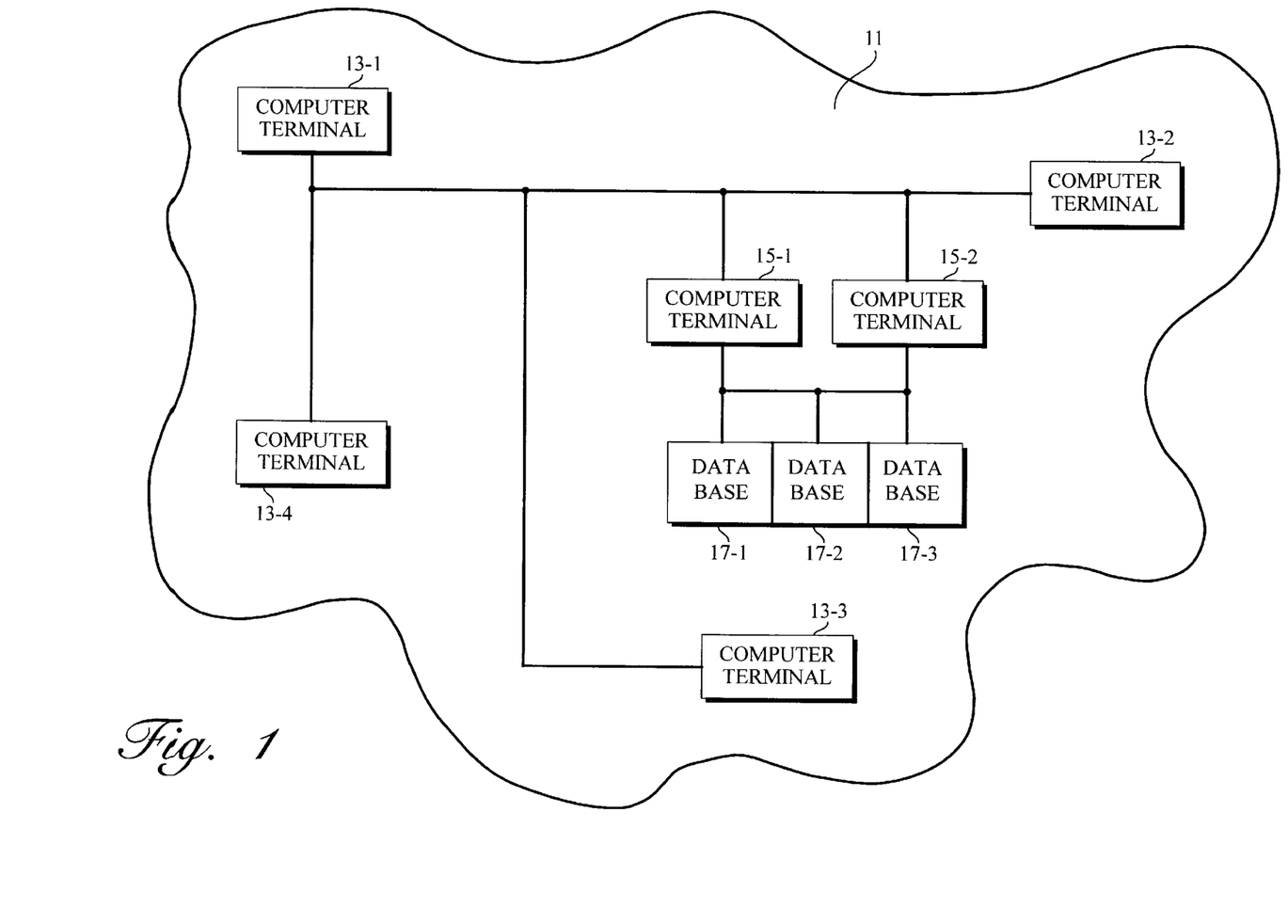
FIG. 1 illustrates an environment in which the invention can be used.
Figure 2A:
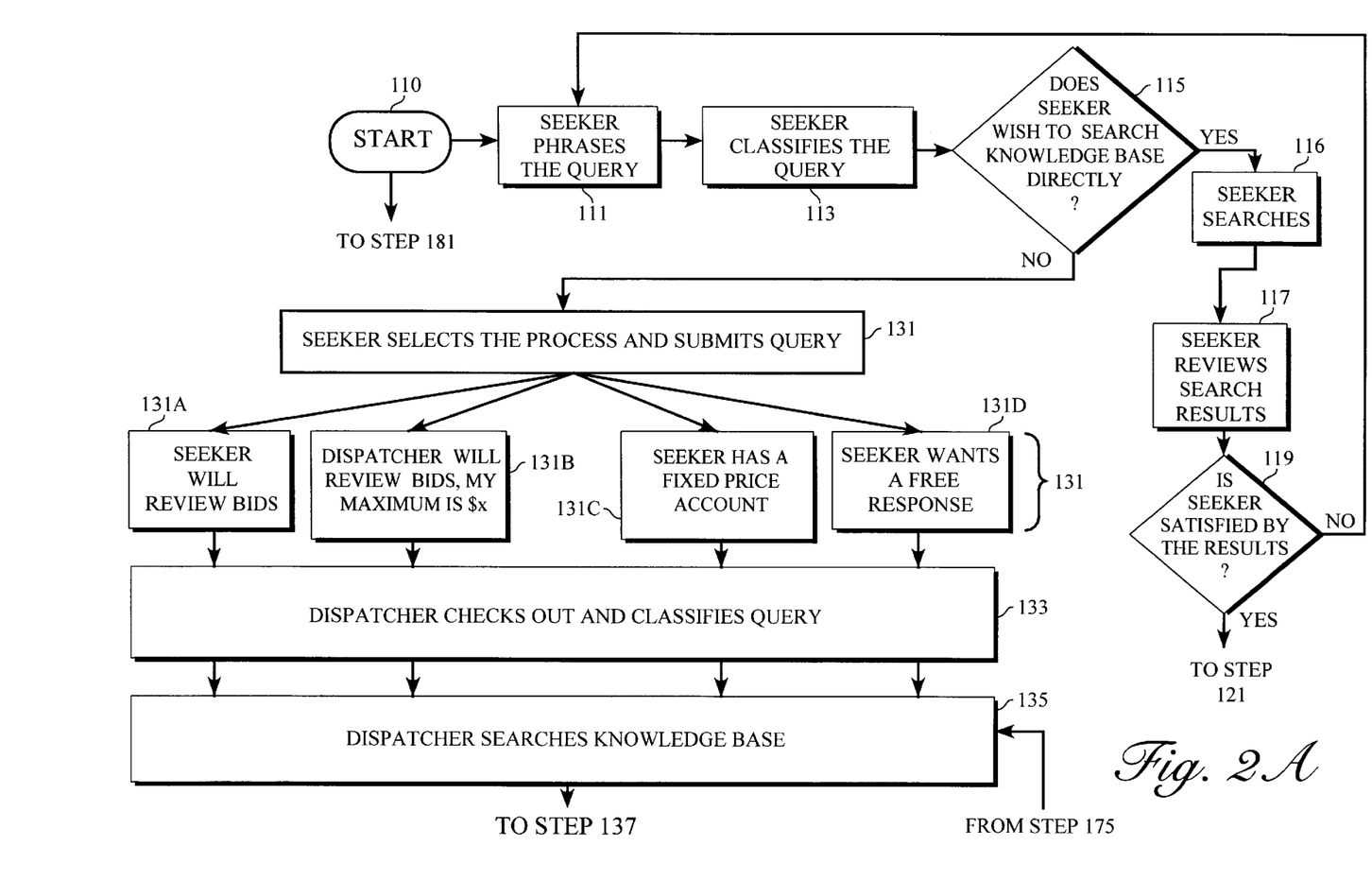
Figure 2B:
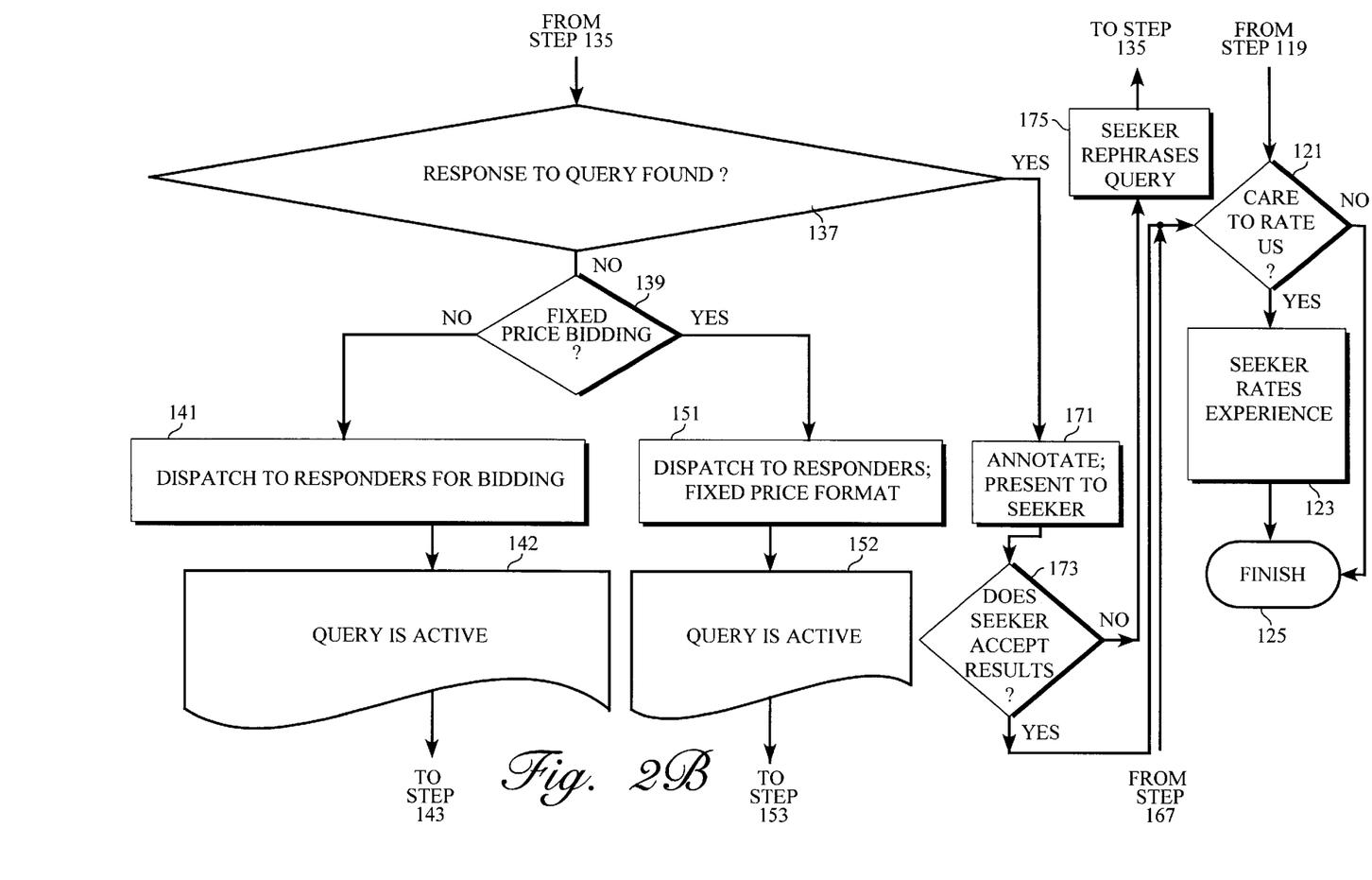
Figure 2C:
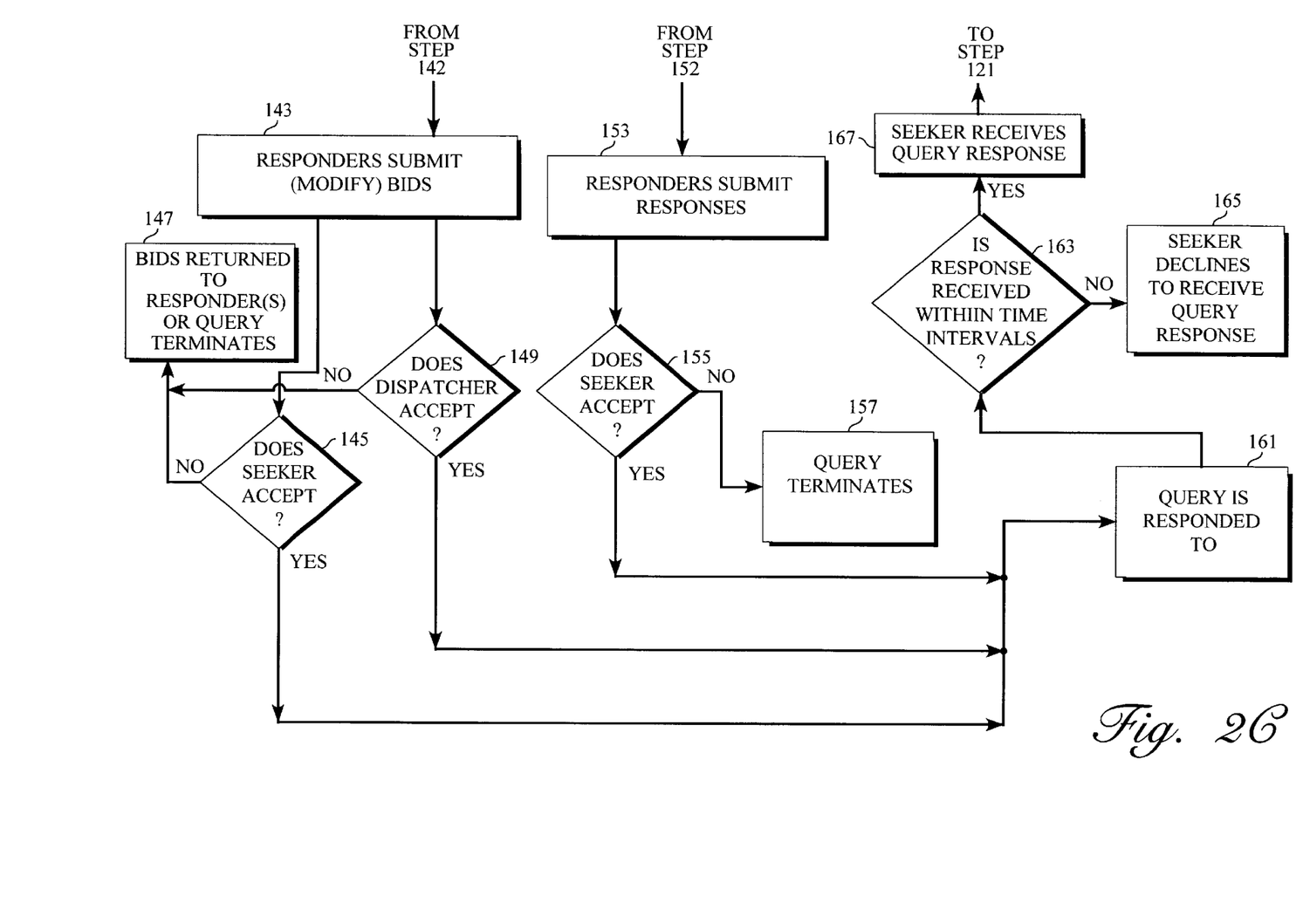
Figure 2D:
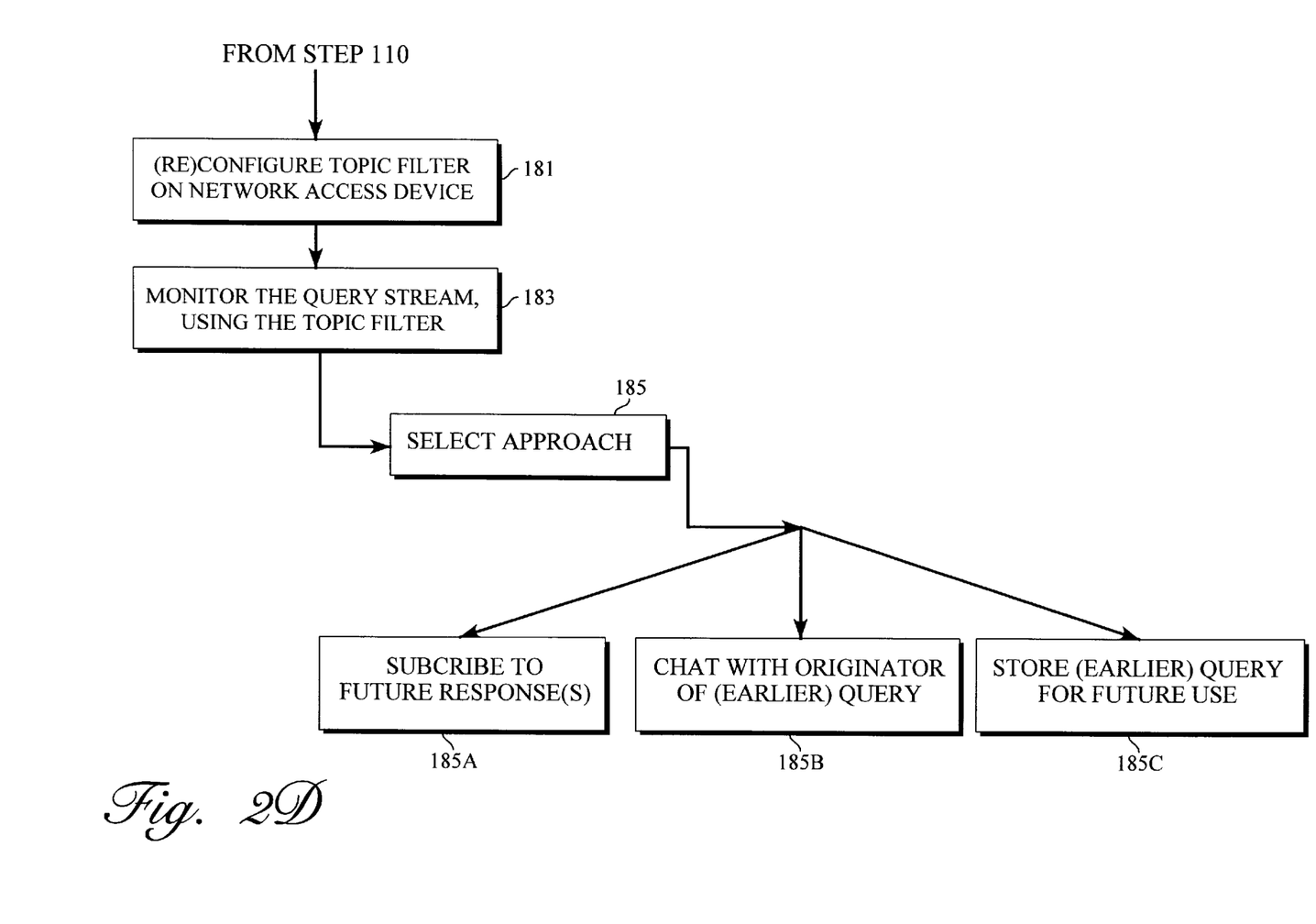

FIG. 1 illustrates an environment in which the invention can be used. An information network 11 facilitates communication between two or more users or information seekers on one or more topics of common interest, using an electronic or other suitable computer-based system. The network 11 includes two or more user terminals or response stations 13-i (i=1, 2, 3, etc.), each of which is preferably capable of transmitting a query or responding to receipt of a query. As indicated in the preceding, a "query" may be a question, seeking information on a specified topic, or may be a statement or comment that may invite or provoke one or more responses from other users on the network 11. Each user terminal 13-i is connected through the network 11 to one or more query dispatchers or coordinators 15-j (j=1, 2, . . . ), and each dispatcher/coordinator is in turn connected to one or more databases 17-k (k=1, 2, . . . ) that can be searched, electronically or otherwise, for information responding to a particular query. A network coordinator 15-j may be a natural person (human being), a computer, or a combination of a natural person and a computer.

FIG. 2 illustrates an embodiment of the invention. A user or information seeker phrases and presents a query to the information network in step 111. The user or a dispatcher preliminarily classifies the query in step 113 (optional). In step 115 (optional), a system associated with the network inquires whether the user wishes to search the knowledge base himself or herself. If the answer to the question in step 115 is "yes", the user conducts a self-search of the knowledge base, in step 116, and optionally reviews the search results in step 117. In step 119, the system optionally inquires whether the search results are satisfactory. If the answer to the question in step 119 is "no", the system returns to step 111, and the user optionally re-phrases and re-presents a modified query. If the answer to the question in step 119 is "yes", the system optionally inquires if the user will rate the knowledge base system, in step 121. If the answer to the question in step 121 is "yes", the knowledge base receives a rating of the search experience and/or search results, in step 123 (optional). Optionally, the user receives "points" or some other acknowledgment, if the user provides a rating of the search experience and/or search results. The search is completed in step 125 (optional), whether the user rates the search experience and/or search results or not.

If the answer to the question in step 115 is "no", the system moves to step 131 and inquires which of four mutually exclusive approaches (steps 131A, 131B, 131C, 131D) the user or information seeker wishes to pursue. The user selects step 131A if the user will receive direct responses to the query and/or will review cost bids or estimated costs, if submission of such costs is appropriate for this query. The user selects step 131B if the dispatcher/coordinator will review any cost bids or estimated costs, optionally subject to a user-specified maximum bid amount. The user selects step 131C if the user maintains an account with the dispatcher or coordinator and a fixed price reply to the query is requested. The user selects step 131D if the user is requesting a free response or reply to the query, with no associated financial or other cost imposed.

From any of steps 131A, 131B, 131C and 131D, the system moves to step 133 and classifies the query. In step 135 a dispatcher or coordinator searches one or more databases, based on the query class, and determines whether one or more responses to the query are found, in step 137.

If the answer to the question in step 137 is "no", the system moves to step 139 and determines whether the user wishes to consult one or more responders based on fixed price bidding.

If the answer to the question in step 139 is "no", the system broadcasts or multicasts the query for bidding by a group of responders with relevant competence in the classification(s) assigned to the query, in step 141. The system receives bids or replies (which may, but need not, recite a financial cost to respond to the query) from the relevant responders and presents the bids to the user or information seeker, in step 143. In step 145, the system determines whether the user accepts one or more of the relevant responders' bids.

If the answer to the question in step 145 is "no", the query is returned to the dispatcher/coordinator and/or the inquiry is terminated, in step 147. If the answer to the question in step 145 is "yes", the query is responded to by one or more relevant responders, in step 161.

If the answer to the question in step 139 is "yes", the system broadcasts or multicasts the query for fixed price bidding by a group of responders with relevant competence in the query classification(s), in step 151. The system receives fixed price bids from the relevant responders and presents the bids to the user or information seeker, in step 153. In step 155, the system determines whether the user accepts one or more of the relevant responders' bids.

If the answer to the question in step 155 is "no", the query is returned to the dispatcher/coordinator and/or the query is terminated, in step 157. If the answer to the question in step 155 is "yes", the query is responded to, in step 161, and the system optionally determines, in step 163, if the response is received within a specified time interval or window.

If the answer to the question in step 163 is "no", the system or seeker optionally declines to receive a response, in step 165. If the answer to the question in step 163 is "yes", a query response is received from one or more relevant responders, in step 167. After step 165, the system optionally moves to step 121 for a user rating of the system.

If the answer to the question in step 137 is "yes", the response is annotated, if appropriate, and presented to the user or information seeker, in step 171. In step 173, the system determines whether the user accepts the response(s). If the answer to the question in step 173 is "yes", the system moves to step 121 for an (optional) rating. If the answer to the question in step 173 is "no", the system moves to step 175 and offers the user an opportunity to re-phrase the query. The system then returns to step 137.

The user or information seeker may wish to use a parallel or related query that has been presented earlier, either by the user or by another network participant, and the response(s), if any, received for the related query. One method of accomplishing this is to (optionally) (re)configure a network topical filter to search for related queries, responses and any other related information, as indicated in step 181. A search of the network is initiated using the topical filter, in step 183. The user is optionally given a choice of (1) subscribing to future responses to the related query (step 185A), (2) chatting with the originator of the related query (step 185B) and/or (3) storing the related query and responses for subsequent use (step 185C).

As indicated in steps 161, 163 and 165 in FIG. 2, the system or a user or information seeker may specify one, two or more time intervals within which a query response will be accepted. If only one time interval is specified (e.g., an interval of length 45 minutes or 16 hours, beginning at the time the query is presented), the user may decline to receive a query response that is presented after the specified time interval has ended, or may accept the proffered query response but offer reduced compensation, if any, for the tardy query response. Where two or more time intervals are specified (which may be, but need not be, overlapping), the user may offer compensation, if any, of a first amount and of a second amount for query responses received within the first time interval and within the second time interval, respectively. The first and second compensation amounts may be the same or may be different. For example, the system or the user may offer a higher compensation amount for a query response that is presented earlier rather than later.

Figure 3A:
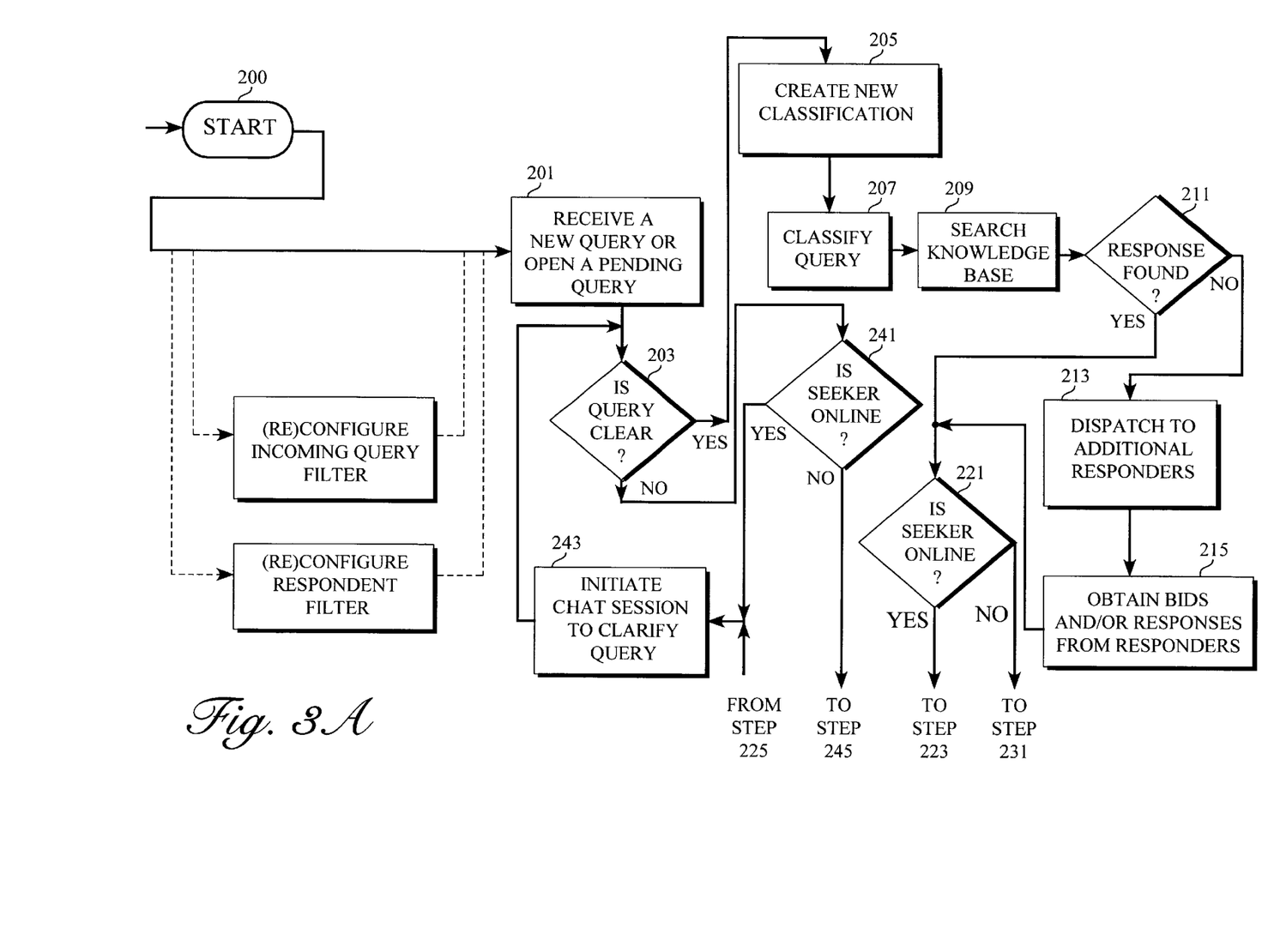
Figure 3B:
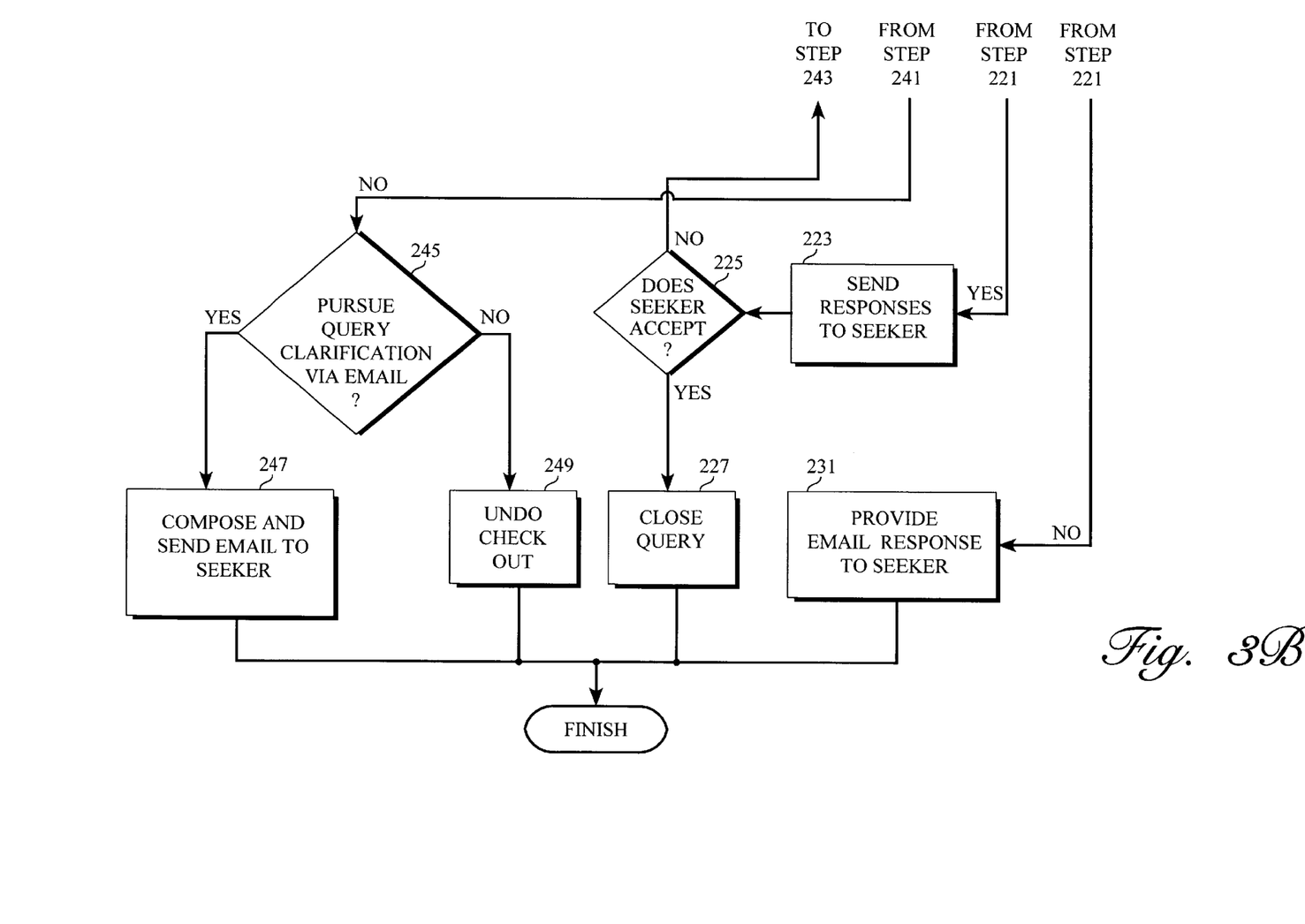

FIG. 3 is a flow chart illustrating an embodiment where the user or information seeker interacts directly with one or more responders concerning the query. In step 201, the system receives a new query. In step 203, the system examines the query and determines whether the query is clearly stated. If the answer to the question in step 203 is "yes", the system optionally creates a new class or category, in step 205, and moves to step 207 to classify the query. In step 209, the system searches an associated knowledge base for a response to the query. In step 211, the system determines whether one or more responses has been found for the query.

If the answer to the question in step 211 is "no", the system moves the query to a new or different knowledge base level, in step 213. In step 215 (optional), the system broadcasts or multicasts the query to one or more relevant responders and moves to step 221, where the system determines whether the user or information seeker is presently on-line. If the answer to the question in step 211 is "yes", the system also moves to step 221.

If the answer to the question in step 221 is "yes", the system moves to step 223, annotates the query (optional) and presents the response(s) to the user or information seeker. In step 225, the system determines whether the user accepts the query response(s). If the answer to the question in step 225 is "yes", the system moves to step 227 and terminates the query, in step 251. If the answer to the question in step 225 is "no", the system moves to step 243 and initiates a chat session with a relevant responder to clarify the query and returns to step 203.

If the answer to the question in step 221 is "no", the system moves to step 231, where the system annotates the query (optional) and responds to the user or information seeker by e-mail. The system then terminates the query, in step 251.

If the answer to the question in step 203 is "no", the system moves to step 241 and determines whether the user or information seeker is presently on-line. If the answer to the question in step 241 is "yes", the system moves to step 243, then to step 203. If the answer to the question in step 241 is "no", the system moves to step 245 and determines whether clarification from the user by e-mail is appropriate. If the answer to the question in step 245 is "yes", the system composes and transmits to the user an e-mail request for clarification of the query, in step 247. If the answer to the question in step 245 is "no", the system optionally stores the request for clarification, in step 249, and terminates the session, in step 251.

Figure 4A:
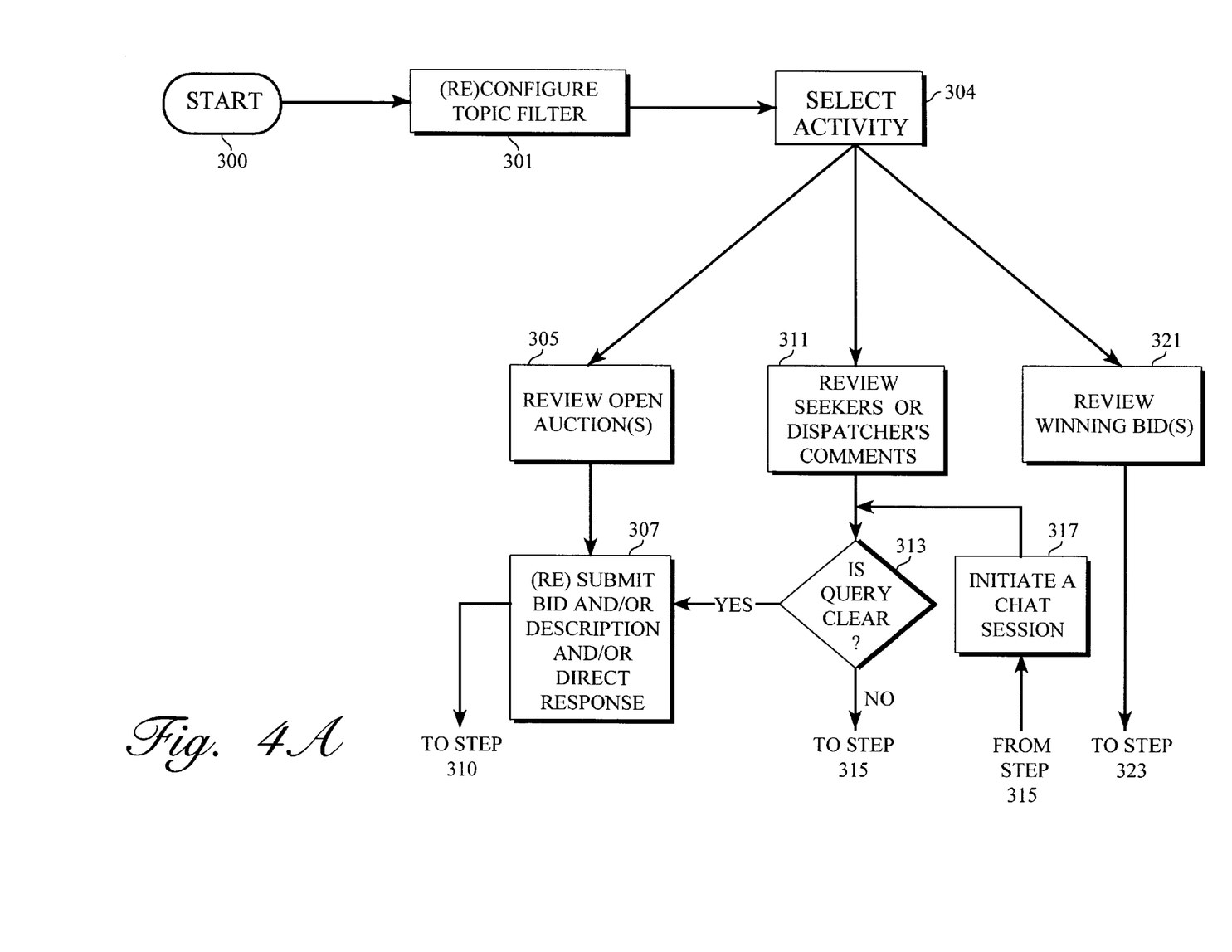
Figure 4B:
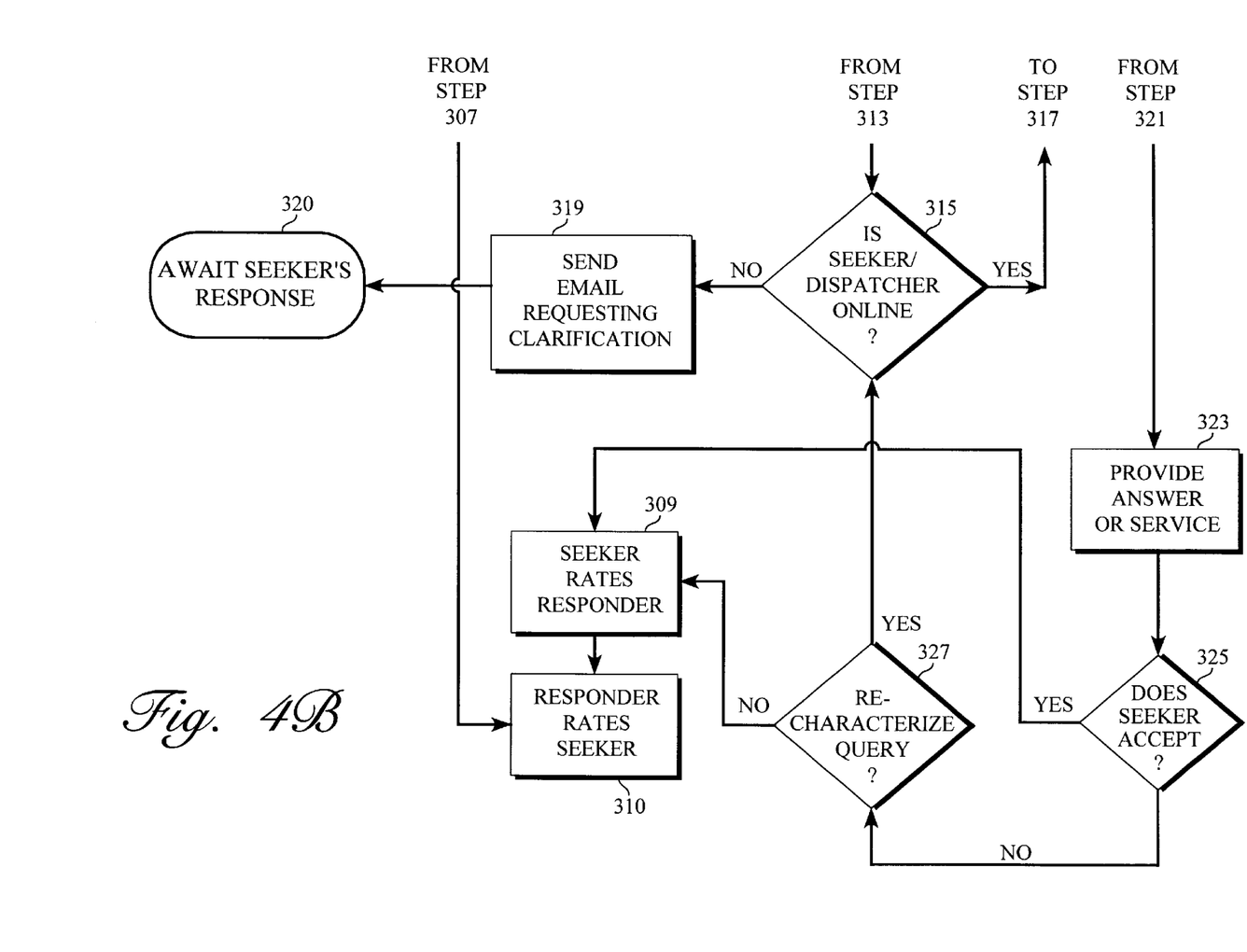

FIG. 4 illustrates in greater detail some options that are available to a potential query responder in an embodiment of the invention. In step 301, after receiving a query, the responder optionally reformats or reconfigures one or more topic filters and proceeds to step 304. In step 304, the responder selects an activity from at least three alternatives: review open auction bid(s) on queries presented, in step 305; review seeker and/or dispatcher comments on queries, in step 311; and review one or more winning bids on queries, in step 321.

If the activity in step 305 is chosen, the responder proceeds to step 307 and (re)submits the bid(s) and/or query description and/or any direct response. The seeker rates the responder, in step 309 (optional), and/or the responder rates the seeker or source of the query, in step 310 (optional).

If the activity in step 311 is chosen, the responder moves to step 313 and determines if the query, as originally stated or as subsequently amended, is sufficiently clear to allow a response (or bid). If the answer to the question in step 313 is "yes", the responder moves to step 309 and follows the path associated with step 305.

If the answer to the question in step 313 is "no", the responder determines if the seeker is on line or otherwise available. If the answer to the question in step 315 is "yes", the responder initiates a chat session with the seeker, in step 317; and, as a result of further discussions in the chat session, the responder returns to step 313. If the answer to the question in step 315 is "no", the responder transmits an e-mail message to the seeker, in step 319, and awaits the seeker's response, in step 320.

If the activity in step 321 is chosen, a responder with a winning bid provides an answer or service, in step 323, and determines if the seeker accepts the answer or service, in step 325. If the answer to the question in step 325 is "yes", the responder proceeds to the (optional) steps 309 and 310. If the answer to the question in step 325 is "no", the responder determines whether the query and/or any further description of the query should be recharacterized. If the answer to the question in step 327 is "no", the responder proceeds to the (optional) steps 309 and 310. If the answer to the question in step 327 is "yes", the responder proceeds to step 315 and follows that path.

Classification of a received query, as in step 113 in FIG. 2 or as in step 207 in FIG. 3, may follow several alternatives. In a first alternative, a single human dispatcher may review the query, determine or provide a suitable classification, and direct the query to an appropriate information repository, responder or group of responders.

In a second alternative, a received query may be reviewed by two or more dispatchers, each of whom provides an independent query classification. If the two or more classifications provided are consistent with each other, the classifications are combined or unified into a single (possibly expanded) classification. If the two or more classifications are inconsistent with each other, the classification provided by the dispatcher with the highest rating, based on past experience, is selected as the classification for the received query.

In a third alternative, if the two or more classifications are inconsistent with each other, the classifications provided by each dispatcher are combined into an expanded classification, having more than one class, for the received query.

In a fourth alternative, if at least two of the classifications are inconsistent with each other, the classifications are grouped into a majority grouping of classifications that are at least broadly consistent with each other and a minority grouping of classifications (outliers), each of which is inconsistent with the majority grouping. Only the classifications in the majority grouping are retained.

In a fifth alternative, classifications are initially arranged in a hierarchical format in two or more super-broad categories, with each super-broad category having a hierarchical arrangement of classifications within itself. All query classifications within a single super-broad category are grouped under a single heading within this category that is specific as possible (as far down the list as possible). Where no other heading within this single super-category can be found that includes all the proffered query classifications within this category, the super-broad category itself becomes the classification for this group, in a "central tendency" classification.

What is claimed is:

1. A system for mediated exchange of information, the system comprising:

a dispatcher system to receive an information query from a query source and to provide at least one classification for the received query, based on a classification format associated with the dispatcher system; and a computer system that is programmed:
  to present the received query to a query filtering system that examines a selected source of one or more queries previously presented, applies a query filter to compare at least one previously presented query with the received query, and provides a selected indicium indicating whether the at least one previously presented query substantially agrees with the received query;
  when the at least one previously presented query does not substantially agree with the received query, to cause a first information repository search to be performed in response to the query,
  to provide results of the first repository search and to determine if a first positive response to the query is provided in the results;
  when the first positive response is provided from the first repository search results, to provide the results for the query source; and
  when the first positive response is not provided from the first repository search results:
    to provide the query to each of a selected group of one or more human query responders and to receive a query reply, related to the received query, from at least one of the query responders; and
    to select at least one of the responding query responders to provide a second positive response to the query, to receive the second positive response to the query from the selected responding query responder, and to provide the second positive response for the source of the query.

2. The system of claim 1, wherein said dispatcher system is part of said computer system that assigns said received query to at least one classification for a query search.

3. The system of claim 1, wherein said dispatcher includes a human being who receives and examines said received query and assigns said query to at least one classification for a query search.

4. The system of claim 1, wherein said dispatcher system collects at least two classifications for said received query, assigns a numerical weight to each classification, and provides a selected classification for said query based on values of the numerical weights relative to each other.

5. The system of claim 4, wherein said numerical weight assigned to said classification is determined by a numerical rating assigned to a source for said classification.

6. The system of claim 1, wherein said dispatcher system collects at least two classifications for said received query and assigns a broadened classification to said query that covers the at least two classifications for said received query.

7. The system of claim 1, wherein said dispatcher system collects and compares at least three classifications for said received query with each other and deletes at least one selected classification when the selected classification is inconsistent with each of at least two other classifications provided by said dispatcher system.

8. The system of claim 1, wherein said computer system is further programmed:
  to receive from said source of said received query a modified query
  to cause a second information repository search to be performed in response to the modified query;
  to provide results of the second repository search and to determine if a third positive response to the modified query is provided in the results; and
  when the third positive response is provided from the second repository search, to provide the results for a source of the modified query.

9. The system of claim 8, wherein said computer system is further programmed:
  when said third positive response is not provided from said second repository search results, to provide said modified query to each of said selected group of query responders and to receive a query reply, from at least one of said query responders, for responding to said modified query; and
  to select at least one of said replying query responders to provide a fourth positive response to said modified query, when said third positive response is not provided from said second repository search results, to receive the fourth positive response to said modified query from the selected replying query responder, and to provide the fourth positive response for said query source.

10. The system of claim 1, wherein said computer is further programmed:
  to determine whether said query source accepts said first positive response, when said first positive response is provided from said first repository search; and
  when said query source does not accept said first positive response:
    to provide said query to each of said selected group of human query responders and to receive said query reply to said query, from at least one of said query responders; and
    to select at least one of said responding query responders to provide said second positive response to said query, and to receive said second positive response to said query from said selected responding query responder.

11. The system of claim 1, wherein said computer is programmed to receive and analyze an indicium from said query source that provides a rating of at least one of said first repository search and said selected responding query responder, based on at least one of the following criteria: promptness of response to said query; relevance of response to said query; completeness of response to said query; and cost of response to said query.

12. The system of claim 1, wherein said computer is programmed:
  to receive an upper limit on an estimated cost for said second response to said query by one of said selected group of said query responders; and
  to select said query responder to respond to said query only if said query reply by said query responder includes an estimated cost that is no greater than the upper limit on estimated cost provided for said second response to said query.

13. The system of claim 1, wherein said computer is programmed:
  to receive an upper limit on an estimated cost for said second response to said query by one of said selected group of said query responders; and
  when each of said query replies received from said query responders includes an estimated cost that is greater than the estimated cost upper limit, to allow at least one of said query responders to submit a revised estimated cost and to compare each revised estimated cost with the estimated cost upper limit.

14. The system of claim 1, wherein said received query is received as at least one of: (1) a statement of asserted fact and (2) a question relating to information that may be available on a specified topic.

15. The system of claim 1, wherein, when said previously presented query substantially agrees with said received query, said system provides at least a portion of said first positive response for said previously presented query and said second positive response for said previously presented query for review by said query source.

16. The system of claim 1, wherein said computer is further programmed to provide, for said query source, an indication of whether at least one source of said previously presented query that substantially agrees with said received query is presently available to communicate with said query source.

17. The system of claim 1, wherein a unique query identifier is associated with each of said queries and said selected indicium, for said previously presented query that substantially agrees with said received query, includes at least a portion of the unique query identifier.

18. The system of claim 1, wherein said dispatcher system allows at least one change in said classification format.

19. The system of claim 18, wherein said change allowed in said classification format includes at least one of: addition of a class to said format; deletion of a class from said format; and reclassification of at least a portion of queries belonging to a class.

20. The system of claim 1, wherein said computer is further programmed to provide a sequence of one or more selected time intervals for receipt of said second positive response to said query from said at least one selected query responder.

21. The system of claim 20, wherein said computer is further programmed to provide at least first and second of said selected time intervals and to provide a first compensation amount and a second compensation amount for receipt of said second positive response within the first selected time interval and within the second selected time interval, respectively.

22. A method for mediated exchange of information, the method comprising:
receiving an information query from a query source and providing at least one classification for the received query, based on a selected classification;
providing a query filtering system that examines a selected source of one or more queries previously presented, applies a query filter to compare at least one previously presented query with the received query, and provides a selected indicium indicating whether the at least one previously presented query substantially agrees with the received query;
when the at least one previously presented query does not substantially agree with the received query, causing a first information repository search to be performed in response to the query;
providing results of the first information repository search and determining if a first positive response to the query is provided in the results;
when the first positive response is provided from the first repository search results, providing the results for the query source; and
when the first positive response is not provided from the first repository search results:
providing the query to each of a selected group of one or more human query responders, and receiving a query reply, related to the received query, from at least one of the query responders; and
selecting at least one of the responding query responders to provide a second positive response to the query, receiving the second positive response to the query from the selected responding query responder, and providing the second positive response for the source of the query.

23. The method of claim 22, further comprising assigning said received query to at least one classification for a query search.

24. The method of claim 22, further comprising causing a human being to receive and examine said received query and to assign said query to at least one classification for a query search.

25. The method of claim 22, further comprising collecting at least two classifications for said received query, assigning a numerical weight to each classification, and providing a selected classification for said query based on values of the numerical weights relative to each other.

26. The method of claim 25, further comprising assigning said numerical weight to said classification based on a numerical rating assigned to a source for said classification.

27. The method of claim 22, further comprising collecting at least two classifications for said received query and assigning a broadened classification to said query that covers the at least two classifications for said received query.

28. The method of claim 22, further comprising collecting and comparing at least three classifications for said received query with each other, and deleting at least one selected classification when the selected classification is inconsistent with each of at least two other classifications provided by said dispatcher system.

29. The method of claim 22, further comprising:
receiving from said query source a modified query;
causing a second information repository search to be performed in response to the modified query;
providing results of the second repository search and determining if a third positive response to the modified query is provided in the results; and
when the third positive response is provided from the second repository search, providing the results for a source of the modified query.

30. The method of claim 29, further comprising:
when said third positive response is not provided from said second repository search results, providing said modified query to each of said selected group of query responders, and receiving a query reply, from at least one of said query responders, for responding to said modified query; and
selecting at least one of said replying query responders to provide a fourth positive response to said modified query, when said third positive response is not provided from said second repository search results, receiving the fourth positive response to said modified query from the selected replying query responder, and providing the fourth positive response for said query source.

31. The method of claim 22, further comprising:
determining whether said query source accepts said first positive response, when said first positive response is provided from said first repository search; and
when said query source does not accept said first positive response:
providing said query to each of said selected group of human query responders, and receiving said query reply to said query, from at least one of said query responders; and selecting at least one of said responding query responders to provide said second positive response to said query, and receiving said second positive response to said query from said selected responding query responder.

32. The method of claim 22, further comprising receiving and analyzing an indicium from said query source that provides a rating of at least one of said first repository search and said selected responding query responder, based on at least one of the following criteria: promptness of response to said query; relevance of response to said query; completeness of response to said query; and cost of response to said query.

33. The method of claim 22, further comprising:

receiving an upper limit on an estimated cost for said second response to said query by one of said selected group of said query responders; and selecting said query responder to respond to said query only if said query reply by said query responder includes an estimated cost that is no greater than the estimated cost upper limit provided for said second response to said query.

34. The method of claim 22, further comprising:

receiving an upper limit on an estimated cost for said second response to said query by one of said selected group of said query responders; and when each of said query replies received from said query responders includes an estimated cost that is greater than the estimated cost upper limit, allowing at least one of said query responders to submit a revised estimated cost and comparing each revised estimated cost with the upper limit.

35. The method of claim 22, further comprising including in said received query at least one of: (1) a statement of asserted fact and (2) a question relating to information that may be available on a specified topic.

36. The method of claim 22, further comprising:

when said previously presented query substantially agrees with said received query, providing at least a portion of said first positive response for said previously presented query and said second positive response for said previously presented query for review by said query source.

37. The method of claim 22, further comprising providing, for said query source, an indication whether at least one source of said previously presented query that substantially agrees with said received query is presently available to communicate with said query source.

38. The method of claim 22, further comprising:

associating a unique query identifier with each of said queries; and including at least a portion of the unique query identifier for said selected indicium, for said previously presented query that substantially agrees with said received query.

39. The method of claim 22, further comprising allowing at least one change in said classification format.

40. The method of claim 39, further comprising including said change allowed in said classification format, at least one of: addition of a class to said format; deletion of a class from said format; and reclassification of at least a portion of queries belonging to a class.

41. The method of claim 22, further comprising providing a sequence of one or more selected time intervals for receipt of said second positive response to said query from said at least one selected query responder.

42. The method of claim 41, further comprising providing at least first and second of said selected time intervals and providing a first compensation amount and a second compensation amount for receipt of said second positive response within the first selected time interval and within the second selected time interval, respectively.

* * * * *